(12) United States Patent
De Cunha Maluf

(10) Patent No.: US 10,883,766 B2
(45) Date of Patent: Jan. 5, 2021

(54) SYSTEM OF DOUBLE CONCENTRIC PIPES HAVING DIFFERENT ENTHALPY

(71) Applicant: R. NETO S.A., Provincia de Buenos Aires (AR)

(72) Inventor: Marco Aurelio De Cunha Maluf, Provincia de Buenos Aires (AR)

(73) Assignee: R. Neto S.A., Buenos Aires (AR)

( * ) Notice: Subject to any disclaimer, the term of this patent is extended or adjusted under 35 U.S.C. 154(b) by 44 days.

(21) Appl. No.: 16/267,497

(22) Filed: Feb. 5, 2019

(65) Prior Publication Data

US 2020/0132384 A1 Apr. 30, 2020

(30) Foreign Application Priority Data

Oct. 30, 2018 (AR) .............................. P20180103149

(51) Int. Cl.
*F28D 7/00* (2006.01)
*F28D 7/10* (2006.01)

(52) U.S. Cl.
CPC .................................... *F28D 7/106* (2013.01)

(58) Field of Classification Search
CPC .................................... F28D 7/106; F24D 9/00
USPC .......................................................... 165/45
See application file for complete search history.

(56) References Cited

U.S. PATENT DOCUMENTS

| | | | |
|---|---|---|---|
| 5,553,456 A * | 9/1996 | McCormack | C02F 1/22 62/59 |
| 2005/0120715 A1 * | 6/2005 | Labrador | F01K 27/00 60/618 |
| 2009/0126923 A1 | 5/2009 | Montgomery | |
| 2011/0061832 A1 * | 3/2011 | Albertson | F24D 9/00 165/45 |
| 2013/0087306 A1 | 4/2013 | Winn | |
| 2013/0202363 A1 * | 8/2013 | Haemers | B09C 1/00 405/258.1 |
| 2014/0196456 A1 * | 7/2014 | Zhou | F01K 13/00 60/659 |

FOREIGN PATENT DOCUMENTS

| | | |
|---|---|---|
| AR | 107309 | 4/2018 |
| JP | 2001280711 | 10/2001 |
| WO | WO2014080348 | 5/2014 |

* cited by examiner

Primary Examiner — Davis D Hwu
(74) Attorney, Agent, or Firm — Defillo & Associates; Evelyn A Defillo

(57) ABSTRACT

A system of double concentric pipes having different enthalpy including a plurality of double pipes where the internal pipe is made of a material of high thermal conductivity and the external pipe is made of a material of low thermal conductivity.

3 Claims, 3 Drawing Sheets

SYSTEM OF DOUBLE CONCENTRIC PIPES HAVING DIFFERENT ENTHALPY

The present invention relates to a system of double concentric pipes having different enthalpy that is an improvement of patent application number P20170100033 related to a vertical geothermal aero exchanger.

In order to make the present improvement application understandable, so that it can be easily implemented, an accurate description of a preferred embodiment will be given in the following paragraphs.

The components referred to in the description may be selected from various equivalents without implying departing from the principles of the invention established in this documentation.

PRIOR ART—OBJECT

As it has been said in the application P20170100033, it is known that the planet's crust has stable areas in which there are a low caloric power and unstable areas where the caloric power is high.

Between both areas, there are others of intermediate temperatures that allow establishing the different types of geothermal energy that corresponds to each one of them.

It can be affirmed that the geothermal energy of the unstable areas has a temperature ranging between 150° C. and 400° C.

A high enthalpy field like this is used, for example, to generate steam and move a turbine to obtain electricity.

Deepening the segmentation, it can also find areas of medium temperature (between 90° C. and 150° C.) and areas of low temperature (between 30° C. and 90° C.), a range that although it is insufficient to produce electrical energy, allows taking advantage of the temperature difference that exists between the near subsoil and the outside.

The areas where the geothermal energy is lower than 30° C. are considered to be of very low temperature but are suitable for use in climate control systems.

To take advantage of the gradient between air and earth temperatures, heat pumps or heat exchangers are used.

The climate control system using the proposal disclosed in the application P20170100033 presents numerous advantages over the existing devices in the prior art.

In effect, the geothermal energy is continuously usable and predictably throughout the entire year; it is also clean, alternative and renewable, and considering that as calculated, our planet, as we know it, has a remaining life of about five billion years. It can be said that we are facing an inexhaustible source of energy, that is profitable and efficient.

The use of geothermal energy does not require fuel deposits, or batteries, resulting in a system of high efficiency, low operational cost, and safer.

Another benefit provided by the described invention is that of causing a minimal environmental impact as a result of there being minimal waste production. For instance, $CO_2$ emissions are reduced by 95%, compared to conventional conditioning systems.

The location of the system gets adapted to the needs of the building without changing the visual aspect and, since it uses energy areas within the territory, it does not use external energy sources and is therefore not subject to variations in international prices or prices of foreign exchange.

The solution provided by the application P20170100033 allows the environment climate within a range of between 15° C. and 24° C. with external temperatures of the order of between −5° C. and 40° C. and, considering that solutions of this type have been known for more than 5000 years, it can affirm that they are extremely reliable.

The operation concept of geothermal climate control systems, or with known air-to-ground heat exchangers, is based on the thermal stability that exists under the surface of the earth. The depth determines the level of temperature that is constant within an area and establishes a range that is practically independent of the temperature oscillations that occur on the earth's crust.

The temperature recorded on the earth's crust for a given area of the planet varies between certain parameters that are given by climatic factors and the position of the earth in its orbit around the sun.

These temperatures are practically independent of the measurements under the surface but are closely related to the depth.

In an established area, the greater the depth at which records are taken, the greater is the thermal stability obtained.

Such records will present variations according to the area of the planet where they are obtained but with a tendency to unification as the measurements approach the core of the planet.

The strip between the surface and a depth of approximately 10 meters has variations due to the influence of the external environment, but between 10 m and 20 m depth, the incidence of the external environment is practically nil, so that this layer is ideal to place the provision disclosed in the application P20170100033.

It has been calculated that the temperature varies 1° C. for every 10 meters of depth, so the most appropriate depth to install the arrangement of the application P20170100033 is the strip between 10 meters and 20 meters deep, since, attentive to the minimum temperature variation that registers below 20 meters, installation at greater depth would be uneconomical.

It is important to rely on thermal stability, since it favors the exchange of heat between the subsoil and any other fluid such as, for example, air.

For this reason, to achieve a provision as revealed in the application P20170100033, of the appropriate dimensions, the first thing that corresponds is to establish the enthalpy of the place.

In effect, the depth at which the pipes must be buried must provide the greatest possible thermal equilibrium, independent of the underground temperature of the surface to achieve thermal stability that should be between 11° C. and 24° C.

If the exchanger system gets located near the surface of the land, the movement of lands as well as the cost of the work will be low, but the high thermal fluctuation will reduce the efficiency of the climatization.

On the other hand, the thermal fluctuation will be reduced, achieving an optimum result at any time of the year, if the exchanger system is located at a depth greater than ten meters, but this implies a greater earth movement and a higher installation cost.

For this reason, in the present application is an improvement of application P20170100033, where are provided concentric pipes formed in materials of different thermal conductivity. The air injected into one of these pipes raises its temperature to an appropriate value for the user, while the remaining pipe isolates it to maintain the air temperature.

This will achieve a suitable temperature with a lower energy expense that can complement the temperature of the air injected from the heat exchanger with the same.

In the prior art, different types of exchanger circuits are known, and these are of the open, closed, or hybrid type.

The aero-geothermal exchangers include a plurality of tubes located underground to achieve heat exchange between it and the tubes.

In the prior art, the tubes are formed in high thermal diffusion materials to achieve a better heat exchange.

The material of the tubes can be selected, allowing to maintain effectiveness but reducing the diameter or length of the pipes.

It is then an object of the invention that is proposed to have a plurality of concentric double pipes distributed vertically in the ground.

It is also an object of the invention that the inner pipe is formed in a material different from that of the outer pipe.

SUMMARY

Basically, the system of double concentric pipes having different enthalpy of the present application improvement of P20170100033 comprises a plurality of double pipes where the internal pipe is made of a material of high thermal conductivity and the external pipe is made of a material of low thermal conductivity.

DRAWINGS

In order to achieve a better understanding of the object of the present invention in FIG. 1, it shows a view showing a plurality of external tubes linked to heads and branches.

There is also observed an air inlet, an air outlet, a suction pump, an impeller and joints arranged in two different heights.

It is observed that both the external tubes and the branches are arranged below the surface of the ground.

REFERENCES

Figure 1:
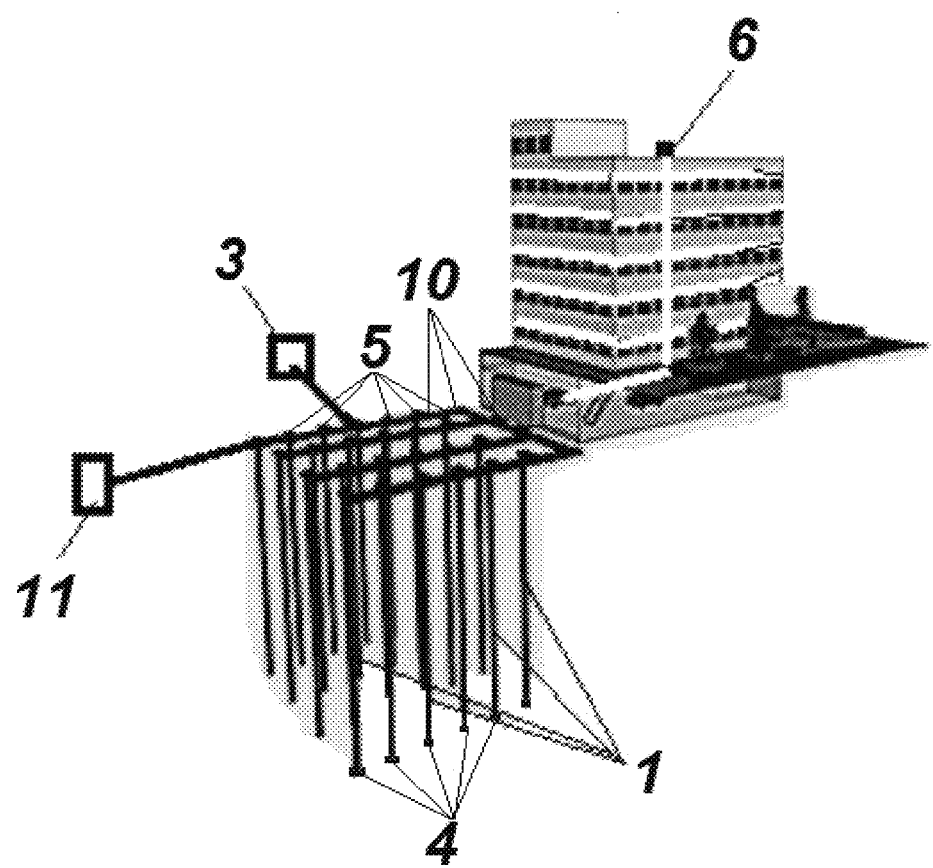
Figure 2:
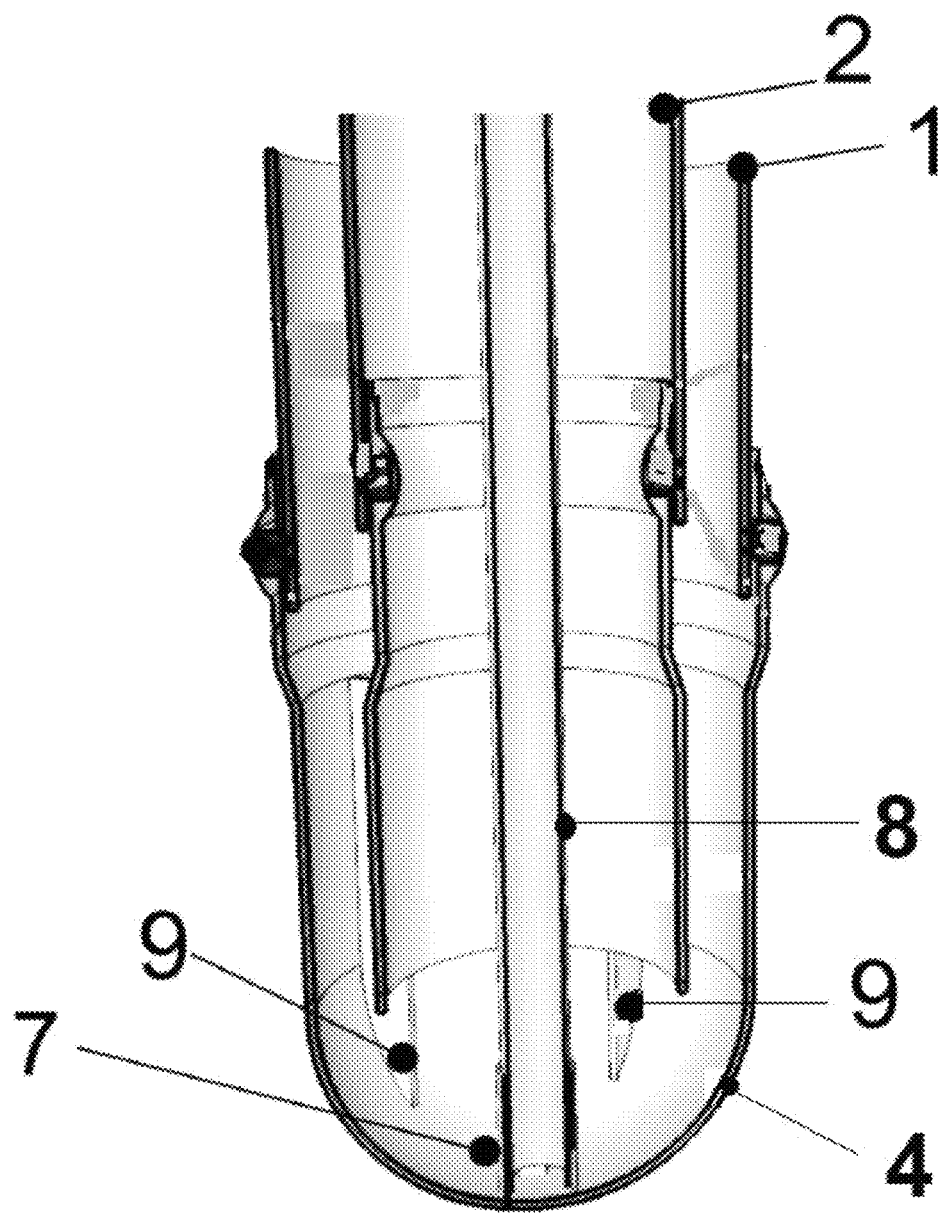
FIG. 2 shows a sectional view that allows to observe the external and internal tubes, the drainage pipe, the head, the wall, the nerve, the seals, the tubular element, the throat, the means of separation, the means of retention, widening, and projections.
Figure 3:
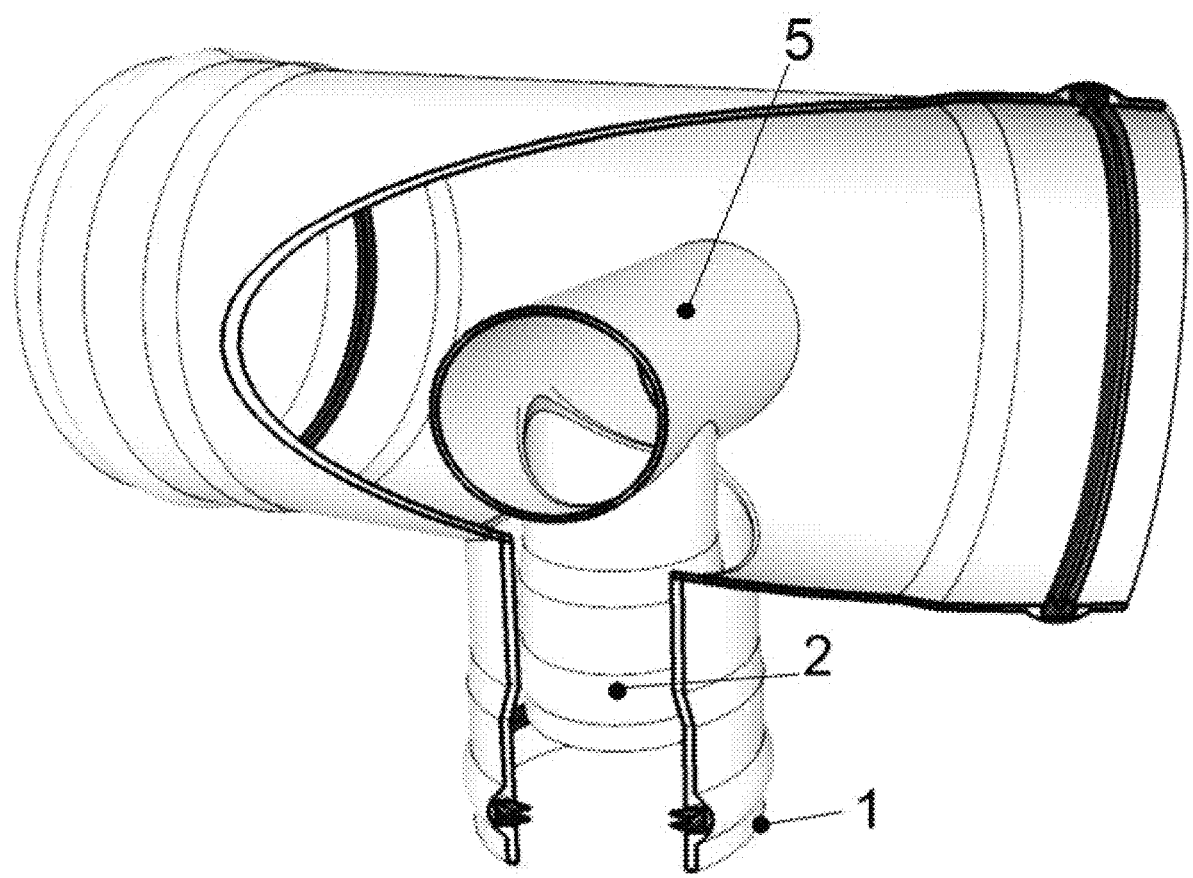
FIG. 3 shows a partially sectioned view of the derivation where a double "T" is represented as well as the external and internal tubes.

In the accompanying Figures, references have been incorporated that allow individualizing the various parts and components of the invention.

In said figures, the same references indicate the same parts or components.

It is individualized accordingly, with the number (1) an external tube; with the number (2) an inner tube; with the number (3) an air inlet; with the number (4) a head; with the number (5) a derivation; with the number (6) an air outlet; with the number (7) a wall; with the number (8) a tubular element; with the number (9) a means of separation; with the number (10) a section and with the number (11) an impeller.

Functioning

According to what is stated in the application number P20170100033, a plurality of concentric pipes is provided, arranged vertically and under the surface of the land, for which an appropriate volume of earth is extracted to bury a sufficient quantity of said concentric pipes as for climatizing or for the selected environments.

Each one of said plurality of concentric pipes is formed with an external tube (1) and an inner tube (2) of smaller diameter that is disposed inside the first one.

Said external tube (1) is connected to an air inlet (3) fluid that is taken from the outside and which runs through said external tube (1) to the lower part of it entering the head (4) and from there to the inner tube (2) traveling upwards towards a derivation (5) that links it with the air outlet (6), a place where it returns to the environment in case of being an open circuit.

If instead of being an open circuit, it were a closed circuit, the air would travel through the inner tube (2) upwards until reaching the branch (5) that forms a double "T" and entering one of the branches of said double "T" which is linked to the air inlet (3) to restart the cycle.

In the case of being in a mixed circuit, the air that rises through the inner tube (2) enters through one of the branches of the double "T" to mix with fresh air that enters from the air inlet (3) to the other branch of said double "T".

Between the internal face of the wall (7) and the cylindrical surface of the tubular element (8), separation device (9) is arranged in a number equal to or greater than two.

The separation device (9) has the function of keeping constant the space between the external (1) and inner (2) tubes, as well as that between the tubular element (8) and the head (4), and project from any of them.

In a preferred embodiment, the separating device (9) includes a fin.

Connected to the branches (5) are tubular sections (10) on which at least one impeller (11) forces the climatized air to the room or the environment.

When using the concentric pipes, it is sought to separate the air inlet (3) from the air outlet (6), and it is also achieved that during the displacement of the air there is a thermal exchange between the external tube (1) and the earth.

In order to favor said exchange, the external tube (1) is formed in a high thermal diffusion material.

During the journey through the inner tube (2), it is sought that the air maintains, as much as possible, the temperature reached during its journey through the external tube (1) so that the material of said inner tube (2) includes one of low thermal diffusion.

Also, in a material with low thermal diffusion, the sections (10) are formed, which are tubular bodies connected to the branches (5) and by which at least one impeller (11) forces the conditioned air into the room(s).

Said branches (5), as well as said at least one impeller (11), are also formed in said low thermal diffusion material in order to reduce the thermal exchange and, consequently, reduce the consumption.

It is proceeding to the study of different materials, both high and low thermal diffusion for the preparation of the external (1) and inner (2) tubes, as well as in the branches (5), the tubular element (8), the sections (10) and the impeller (11).

The study was oriented towards organic and inorganic materials, concluding that among the first, the plastics met the appropriate conditions.

Thus, the high thermal diffusion material is preferably a high-density polyethylene, also known by its acronym (HDPE), while the material of low thermal diffusion would be polyvinyl chloride or PVC.

In effect, the use of High-Density Polyethylene, from now on HDPE as high thermal diffusion material, allows to increase the capacity of thermal exchange between the air circulating in the installed pipes, as it has been diffused in the application P20170100033 and the land and to achieve a higher temperature recovery in less time.

It has been found that the diffusing capacity of HDPE is between two and three times higher than that of Vinyl Polychloride—PVC in the following—the inventors have considered that the outer tube (1) must be made of HDPE to take advantage of its high capacity to exchange temperatures between the air circulating in said external tube (1) and the surrounding earth. On the other hand, the inventors have considered that the inner tube (2), the branches (5), the tubular element (8), the sections (10) and the impeller (11) must conform to PVC, thus achieving that these components maintain the circulating air temperature reached during the passage through the external tube (1).

Other materials that can be taken into consideration for shaping tubes of low thermal diffusion with plastic pipes, previously coated with a product selected from expanded glass, polyethylene foam, elastomeric foam or plastic pipes covered with vermiculite.

With this combination, the invention offers the possibility of having a high capacity to diffuse temperatures as it occurs in the elements formed in HDPE or in the materials that are disclosed in the following and, on the other hand, to have the capacity of conserving the temperature as it results in the elements formed in some of the low thermal diffusion materials to which we refer.

The use of elements that can preserve the temperature of the injected air affects the thermal recovery power of the system in a steady state, which is of great importance to bring the thermal diffusion capacity of the interaction surface to a level similar or superior to that of the surrounding land.

In order to replace the HDPE with PVC, it has been seeking to increase the thermal diffusion of PVC with the addition of minerals, but although its thermal diffusion is increased, it is not enough to equal that of the HDPE.

The thermal advantages of HDPE add its mechanical and strength characteristics that are similar to those of sanitary PVC, making it optimal for use in external tubes (1).

To improve the quality of the air injected into the environments, and taking into account that it is an organic material, the HDPE is treated with an antibacterial material, as is usual in the toilet market. The HDPE with sanitary properties is optimal in humid environments, as is the case of the walls of the external (1) and inner (2) tubes, as a result of condensation due to temperature differences, condensation that is accentuated in times of heat.

Each conduit also has an inner tube (2) of PVC, so that this inner tube (2), concentric, has insulating characteristics or low thermal diffusion, thereby preventing heat exchange between air to be used in environments, temperature stabilized, and that circulates through it and the air that enters through the air inlet (3) that is at the outside temperature and that circulates through the external tube (1).

The use of HDPE with an antibacterial load in the external tube (1) increases the capacity of thermal exchange between the air that circulates through it and the earth and the use of PVC in the inner tube (2) gives it insulating characteristics, which impact the thermal recovery power of the system in a steady state.

This is of fundamental importance to bring the thermal diffusion of the interaction surface to a level similar or superior to that of the surrounding earth. The thermal diffusivity associated with HDPE is higher than that of PVC with mineral aggregates to increase its diffusivity. The use of HDPE is adequate due to its mechanical characteristics and resistance similar to that of sanitary PVC.

Another advantage of using HDPE to form the outer tube (1) is that its price is reasonable and sustainable against the price of alternative materials including PVC with mineral aggregates.

The fact of having a load of antibacterial material, as is commonly used in the market of the plastic industry for sanitary applications, gives it optimum properties for humid environments, such as those resulting from condensation in the pipe.

The use of HDPE with antibacterial agents results in a lower cost than PVC, including PVC with mineral aggregate for the improvement of thermal diffusivity, reaching the same sanitary quality standards.

Materials that can be considered as variants of those disclosed herein include those that meet the thermal needs and bactericidal power already described.

Among the plastic materials that can be used as an alternative, it is necessary to consider the sanitary polypropylene (PPL), which has thermal diffusion properties similar to those of the HDPE and since its common use is water transport, it usually has a bactericidal load incorporated.

As an alternative for making the outer tubes (1), inorganic materials with high thermal diffusion can also be used, such as, for example, hot galvanized steel pipes which are frequently used in water wells. Galvanizing prevents the formation of rust for periods exceeding 50 years. Since there is no organic matter in its composition, the bactericidal properties of the surface are not so necessary.

Other alternative materials that can be used for the manufacture of external tubes (1) are gastronomic stainless steel and aluminum alloys.

Even when these alternative materials meet sanitary conditions, their use is restricted because their cost is greater than that of plastics.

In this way, one of the possible sequences of steps that lead to specifying the invention and the manner in which it functions has been outlined, and the documentation is supplemented with the synthesis of the invention contained in the clauses claiming that are added below.

Having described and determined the nature of the invention, its scope and the manner in which it can be put into practice in its fundamental idea, the following is declared as an invention and of exclusive ownership:

Follow three claims.

The invention claimed is:

1. A system of double concentric pipes having different enthalpy comprising:
    a plurality of pipes, each pipe including:
    an external tube (1); and
    a concentric inner tube (2) placed inside the external tube; wherein the external tube and the inner tube are arranged vertically underground; wherein the external tube (1) is connected to an air inlet (3) which takes air from outside, the air passes through the external tube until reaching a bottom of the external tube and enters a head (4) and then runs upwards through the inner tube (2) until reaching at least one branch (5) connected to an air outlet (6);
    at least one separation device (9) placed between an internal face of a wall (7) and a cylindrical surface of a tubular element (8);
    wherein the at least one branch is connected to tubular sections (10) by which at least one impeller (11) that forces a climatized air into the environments;
    wherein the external tube (1) produces a thermal exchange between the air admitted and the surrounding earth;

wherein the external tube (1) is made of a high thermal diffusion material; and wherein the inner tube (2), the branches (5), the tubular element (8), the sections (10), and the impeller (11) are made of low thermal diffusion material;

wherein the high thermal diffusion material is selected from the group consisting of a high density polyethylene, a high density polyethylene with antibacterial material, a polypropylene with antibacterial material, a sanitary polypropylene, a polyvinyl chloride with added minerals, a polychloride sanitary vinyl, hot galvanized steel, gastronomic stainless steel, and aluminum alloys; and wherein the low thermal diffusion material is selected from the group consisting of polyvinyl chloride, plastic material covered with expanded glass, plastic material covered with polyethylene foam, plastic material covered with elastomeric foam, and plastic material covered with vermiculite.

2. The system according to claim 1, wherein the material of high thermal diffusion is a high-density polyethylene including an antibacterial material.

3. The system according to claim 1, wherein the low thermal diffusion material is polyvinyl chloride.

\* \* \* \* \*